May 26, 1931.　　　S. HERBERT　　　1,807,288
PICTURE SUPPORT
Filed June 11, 1929
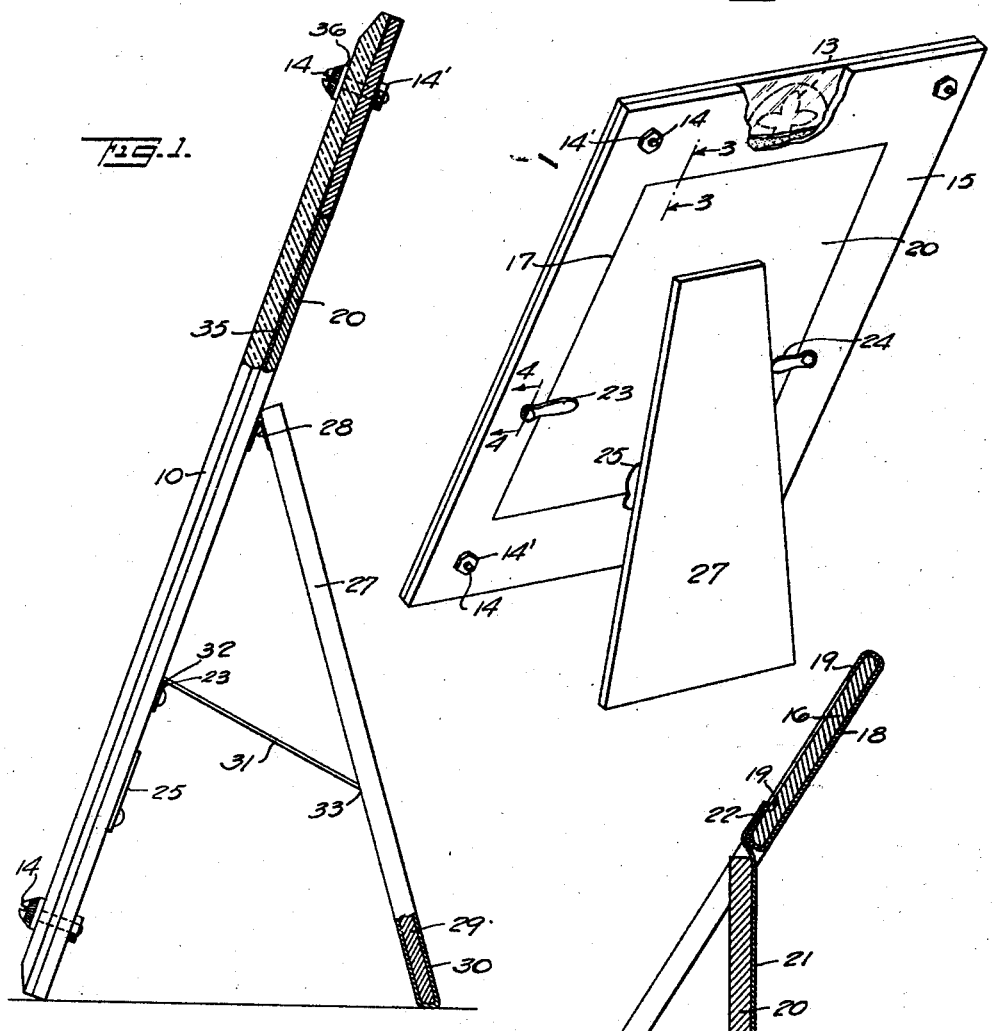
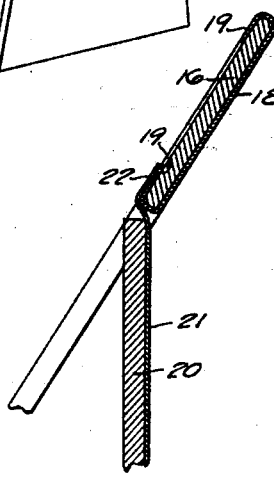
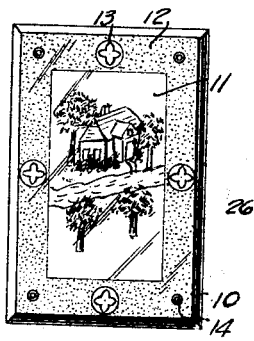
INVENTOR
Sigmund Herbert
BY
ATTORNEY Patented May 26, 1931

1,807,288

UNITED STATES PATENT OFFICE

SIGMUND HERBERT, OF NEW YORK, N. Y.

PICTURE SUPPORT

Application filed June 11, 1929. Serial No. 369,987.

The present invention relates to picture supports or picture frames and is more particularly directed toward a device for this purpose consisting of a glass panel with a suitable back and supporting easel.

The present invention contemplates a picture support or frame employing a front glass panel of the desired shape and to which is detachably secured a back and supporting brace or easel so arranged as to hold a picture behind the glass plate. According to the preferred construction, the back and easel are composed of stiff heavy cardboard covered with cloth, such as velvet.

The accompanying drawings show, for purposes of illustrating the present invention, one of the many possible embodiments in which the invention may take form, it being understood that the drawings are illustrative of the invention rather than limiting the same.

In the drawings:

Figure 1 is a side elevational view with parts in section showing one form of picture support;

Figure 2 is a perspective view of the fixture support taken from the rear with parts broken away to show interior construction;

Figure 3 is an enlarged sectional view taken upon the line 3—3 of Figure 2, to show the hinging of the filler or presser plate;

Figure 4 is a fragmentary sectional view on the line 4—4 of Figure 2; and

Figure 5 is a front view of the picture frame.

The device shown in the present drawings employs a glass plate 10. This glass plate may be of rectangular shape or any other desired shape and is made of suitable size to be somewhat larger than the picture to be employed. This glass plate has a central transparent panel 11 of the size and shape of the picture which is to be framed or supported. Outside of this central panel, the glass is provided with a mirror surface 12, as indicated by the stippling, and if desired designs may be cut into the glass as indicated at 13. These designs of course may take any ornamental form desired, such as rosettes, wreaths, scrolls, etc. The glass plate is drilled to receive four bolts or screws 14.

A form of backplate is shown at 15. This backplate or cover plate is of substantially the same size as the glass panel. It is made up of a sheet of heavy cardboard or other stiffening material 16, a center hole or opening being punched or cut in the cardboard. This cut or opening is of substantially the same size of the picture to be exhibited. This forms a more or less rectangular frame and this frame is covered by a cloth or covering such as velvet indicated at 18. This cloth covering extends about the rear surface of the backplate and covers the upper and lower edges of the cardboard. It is passed around onto the front face of the backplate and pasted to its as indicated at 19. The backplate is secured against the glass by nuts 14' carried on the bolt 14 as indicated. The mirror renders the outer border opaque so that the unfinished face of the back plate is invisible.

The opening 17 accommodates a filler or presser plate 20 also made of cardboard, or other stiffening material. This plate is also covered with cloth 21 and a portion of the cloth is passed up inside the backplate and pasted or secured to it as indicated at 22 thereby providing a hinge between the parts 15 and 20.

The filler or backing plate 20 is adapted to be secured in the opening by swinging finger pieces 23, 24 and 25 pivotally secured on pins 26 carried by the frame 15. One or more of these fingers may be employed, depending upon the size and other conditions which arise in making up the frames. An easel back or brace 27 is secured to the filler or presser plate 20 by a hinge indicated at 28. This back is composed of a heavy piece of cardboard indicated at 29 and a cloth covering 30. A flexible ribbon 31 is secured to the filler or backing plate at 32 and to the easel or brace at 33.

When one desires to insert a picture in place, the fingers 23, 24 and 25 are swung around to permit opening up the back of the picture support. The filler plate 20 swings on the cloth hinge permitting one to insert the picture whereupon the plate may be turned to position thereby securing it in place.

Picture supports such as the one herein shown present a very pleasing appearance. The picture 35 is always covered with glass, and, in the form here shown, the picture is surrounded by the mirror. The mirror may be ornamented by suitably cutting the back surface of the glass. In the particular form here shown, the mirror employed covers the front of the backplate so that one does not see these parts when looking at the picture support when in use. In order to enhance the appearance of the device one may use ornamental rosettes or washers 36 about the bolts 14.

It is obvious that the invention may be embodied in many forms and constructions within the scope of the claims, and I wish it to be understood that the particular form shown is but one of the many forms. Various modifications and changes being possible, I do not otherwise limit myself in any way with respect thereto.

I claim:

1. A picture support comprising a front glass plate having a central transparent panel through which to view a picture, a backplate of substantially the same size as the glass plate, the backplate having an opening substantially the size of the transparent panel, bolts passing through the plates, a filler plate secured to the backplate and fitting into the opening therein, means to secure the filler plate in place to hold a picture behind the glass plate, and a brace hingedly secured to the filler plate.

2. A picture support comprising a front glass plate having a central transparent panel through which to view a picture, a backplate of substantially the same size as the glass plate, the backplate having an opening substantially the size of the transparent panel, bolts passing through the plates, a filler plate secured to the backplate and fitting into the opening therein, means to secure the filler plate in place to hold a picture behind the glassplate, and a brace hingedly secured to the filler plate, the back plate, filler plate, and brace being made of a stiff material covered by cloth.

3. A picture support comprising a front glass plate having a transparent panel through which to view a picture, the plate being rendered opaque outside the panel and having bolt holes in said opaque portion, a back plate of substantially the same size as the front plate, the back plate consisting of cloth covered stiffening material apertured for substantially the size of the transparent panel in the glass plate, bolts passed through the holes in the back plate for securing it to the glass plate, and a cloth covered backing plate hingedly secured to the upper edge of the opening in the back plate and adapted to fill the opening and hold a picture against the panel.

4. A picture support comprising a flat glass plate having an opaque border and a transparent central panel through which to view a picture, a back plate having an aperture the size of the central panel and bolted to the glass plate, the back plate having substantially the configuration of the opaque border and comprising a stiff filler and a cloth covering about the rear side of the filler and its outer and inner edges, the covering being extended over onto the front face of the back plate and secured thereto, whereby the front face of the back plate is unfinished but concealed by the opaque border, and a cloth covered backing plate filling the aperture in the back plate.

Signed at New York city, in the county of New York and State of New York, this 10th day of June, 1929.

SIGMUND HERBERT.